(12) United States Patent
Sprangle et al.

(10) Patent No.: US 10,181,171 B2
(45) Date of Patent: *Jan. 15, 2019

(54) SHARING RESOURCES BETWEEN A CPU AND GPU

(71) Applicant: Intel Corporation, Santa Clara, CA (US)

(72) Inventors: Eric Sprangle, Austin, TX (US); Matt Craighead, Austin, TX (US); Chris Goodman, Austin, TX (US); Belliappa Kuttanna, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/085,778

(22) Filed: Nov. 20, 2013

(65) Prior Publication Data

US 2014/0078159 A1 Mar. 20, 2014

Related U.S. Application Data

(63) Continuation of application No. 12/655,577, filed on Dec. 31, 2009, now Pat. No. 8,669,990.

(51) Int. Cl.
*G06T 1/00* (2006.01)
*G06T 1/20* (2006.01)
*G06F 15/00* (2006.01)
*G06F 15/16* (2006.01)
*G06F 15/167* (2006.01)

(52) U.S. Cl.
CPC ..................................... *G06T 1/20* (2013.01)

(58) Field of Classification Search
None
See application file for complete search history.

(56) References Cited

U.S. PATENT DOCUMENTS

| 6,868,481 | B1 * | 3/2005 | Gaither ............... G06F 12/0822 |
| | | | 711/119 |
| 6,891,543 | B2 | 5/2005 | Wyatt |
| 7,818,806 | B1 | 10/2010 | Gyugyi et al. |
| 8,341,624 | B1 | 12/2012 | Hobbs |
| 8,669,990 | B2 * | 3/2014 | Sprangle .................. G06T 1/20 |
| | | | 345/501 |

(Continued)

FOREIGN PATENT DOCUMENTS

| CN | 1666182 A | 9/2005 |
| CN | 101223504 A | 7/2008 |

(Continued)

OTHER PUBLICATIONS

Office action with summarized English translation from Chinese Patent Application No. 201010623130.2, dated Jul. 26, 2013, 42 pages.

Office action with summarized English translation from Chinese Patent Application No. 201010623130.2, dated Apr. 12, 2016, 15 pages.

(Continued)

*Primary Examiner* — Tize Ma
(74) *Attorney, Agent, or Firm* — Nicholson De Vos Webster & Elliott LLP

(57) ABSTRACT

A technique to share execution resources. In one embodiment, a CPU and a GPU share resources according to workload, power considerations, or available resources by scheduling or transferring instructions and information between the CPU and GPU.

19 Claims, 7 Drawing Sheets

(56) References Cited

U.S. PATENT DOCUMENTS

| | | | |
|---|---|---|---|
| 2004/0160449 A1* | 8/2004 | Gossalia | G06F 3/14 345/543 |
| 2005/0237329 A1 | 10/2005 | Rubinstein | |
| 2006/0136693 A1* | 6/2006 | Baxter | G06F 12/1072 711/168 |
| 2006/0242710 A1 | 10/2006 | Alexander | |
| 2006/0265573 A1 | 11/2006 | Rodney | |
| 2008/0100629 A1* | 5/2008 | Bakalash | G06F 9/5044 345/505 |
| 2008/0270711 A1 | 10/2008 | Kwon et al. | |
| 2009/0037911 A1 | 2/2009 | Ahuja | |
| 2009/0160863 A1 | 6/2009 | Frank | |
| 2010/0085367 A1 | 4/2010 | Jeong et al. | |
| 2014/0052965 A1 | 2/2014 | Sarel | |
| 2014/0313214 A1 | 10/2014 | Munshi et al. | |

FOREIGN PATENT DOCUMENTS

| | | |
|---|---|---|
| CN | 101526934 A | 9/2009 |
| CN | 102323917 A | 1/2012 |
| JP | 63-271537 A | 11/1988 |
| JP | 10283454 A | 10/1998 |
| JP | 2004-171234 A | 6/2004 |
| JP | 2008-536224 A | 9/2008 |
| JP | 2009-205696 A | 9/2009 |

OTHER PUBLICATIONS

Notice of Allowance from Chinese Patent Application No. 201010623130.2, dated Mar. 16, 2017, 4 pages.
Notice of Reasons for Rejection with summarized English translation from Japanese Patent Application No. 2010-279280, dated Aug. 28, 2012, 5 pages.
Decision on Rejection with summarized English translation from Japanese Patent Application No. 2010-279280, dated Jul. 2, 2013, 4 pages.
Notice of Reasons for Rejection with summarized English translation from Japanese Patent Application No. 2013-228304, dated Mar. 17, 2015, 5 pages.
Notice of Reasons for Rejection with summarized English translation from Japanese Patent Application No. 2013-228304, dated Aug. 25, 2015, 5 pages.
Office action with summarized English translation from Taiwanese Patent Application No. 104137555, dated Jun. 24, 2016 10 pages.
Office action with summarized English translation from Taiwanese Patent Application No. 104137555, dated Dec. 26, 2016, 9 pages.
Office Action, "Addendum to the Summons for File Reference 10 2010 055 267.4", dated Dec. 3, 2015, German Patent and Trade Mark Office, 3 pages English Translation.
Office Action, The State Intellectual Property Office of the People's Republic of China, Application No. 201010623130.2, dated Nov. 1, 2012.

* cited by examiner

SHARING RESOURCES BETWEEN A CPU AND GPU

RELATED APPLICATIONS

This is a Continuation of application Ser. No. 12/655,577, filed Dec. 31, 2009, currently pending.

FIELD OF THE INVENTION

Embodiments of the invention relate generally to the field of information processing and more specifically, to the field of shared computing resources within a processor, such as a central processing unit (CPU), graphics processing unit (GPU) or both.

BACKGROUND

As more applications, continue to take advantage of the parallel processing capabilities of multi-processing systems and microprocessors, there is a growing need to share computing resources based on the type of work being done. For example, parallel programs can make use of specialized processing hardware, such as a GPU, whereas more sequentially executing programs can make use of a general purpose CPU. As parallel and sequential operations are comingled more in modern programs, making use of both CPU and GPU resources concurrently or serially will help optimize the computing resources for the type of operations or programs being run.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
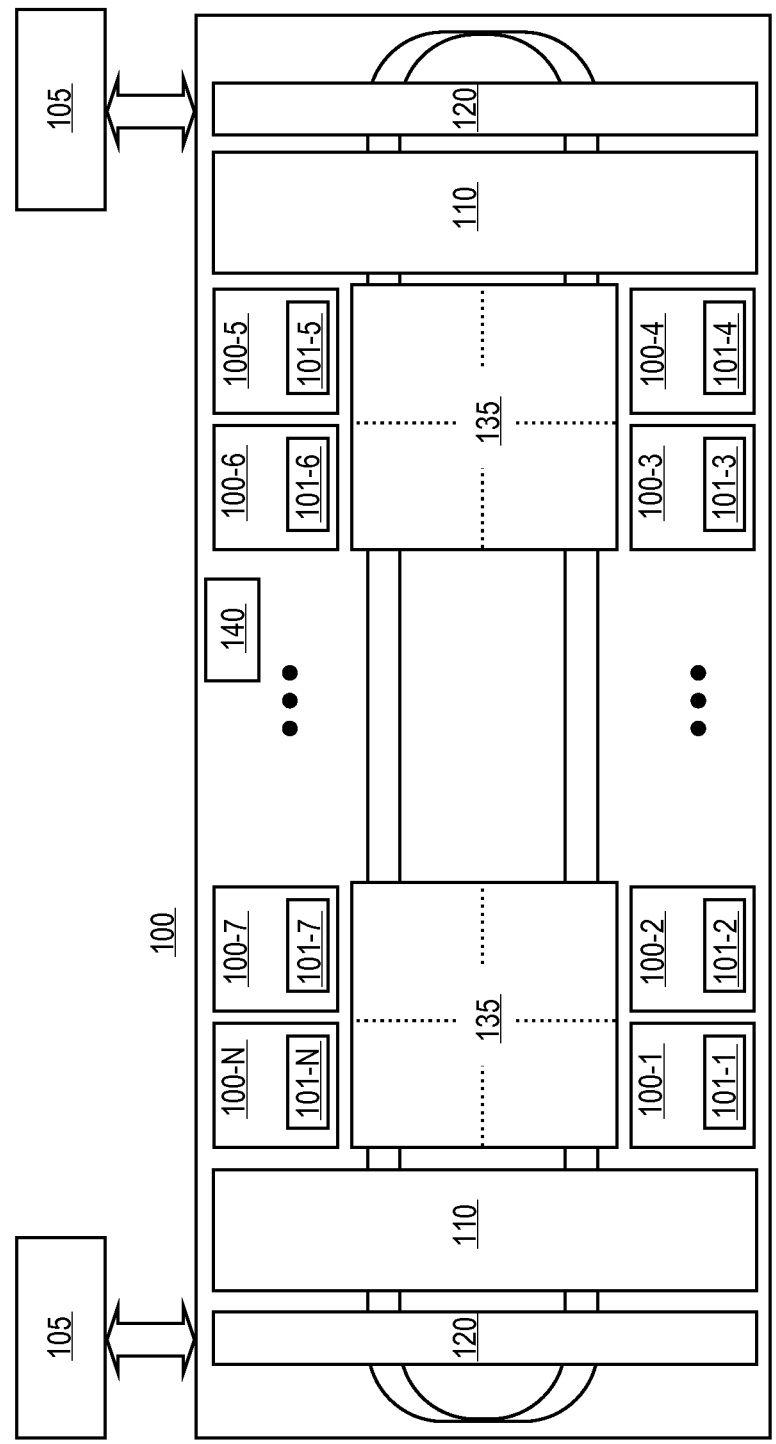
FIG. 1 illustrates a block diagram of a multi-processor system, in which at least one embodiment of the invention may be used.

Embodiments of the invention relate to processing devices and systems, including those that may process parallel or "throughput" applications, as well as more sequentially executing programs. Some embodiments include at least two processing units, such as a CPU for running more sequential code and a GPU for running more parallel code, such as 3D graphics, scientific or financial programs, that make use of parallel processing using, for example single-instruction-multiple-data (SIMD) or "packed" or "vector" instructions. In one embodiment, a program is written without regard to the underlying processing resources (CPU or GPU) and the determination of what processing resources are best used to perform the instructions or threads of a program may be made by the hardware itself, a middle-ware software, such as a driver or driver-like program, or a virtual machine manager or "hypervisor". Furthermore, in some embodiments, a thread or group of instructions running on either the CPU or GPU may make use of available processing capability of other processing resources, such as a CPU or GPU, for portions of the operations being performed by the thread or instructions, sharing information either through a shared memory space or directly over a direct link interconnect.

Various types of operations and programs can make use of embodiments, in which tasks are shared among a GPU and CPU, including 3D graphics rendering programs performing operations according to a GPU operational "pipeline". For example, frustum clipping is an operation used in many 3D graphics applications to determine which polygons appear in a frustum at any given time. This can be a very computationally-intense operation, and not necessarily one that requires the parallel resources of a GPU. Therefore, in one embodiment, some or all of the operations in frustum clipping can be "off-loaded" to a CPU that has available processing capability while the GPU performs other operations. The data the CPU needs to perform frustum clipping can be sent either directly through a direct link to the CPU from the GPU or through a shared memory space, such as PCI memory or shared cache, etc. The results of the frustum clipping can then be returned to the GPU from the CPU through the shared storage or direct link and the GPU can then continue rendering the scene with the frustum clipping results from the CPU. In one embodiment, the control of this kind of resource sharing is controlled by logic within the CPU and/or GPU (or logic outside of both), whereas in other embodiments, the sharing of the resources can be controlled by a middle-ware software, such as a driver, hypervisor, etc., such that user-software is unaware of the resource sharing.

Embodiments of the invention enable software applications to access and store information in multiple storage structures corresponding to multiple processors. This may be helpful, in some instances, when processing parallel instructions or applications that make use of single-instruction-multiple-data (SIMD) or multiple-instruction-multiple-data (MIMD) operations, because each SIMD or MIMD operation can access operand data elements from shared memory structures, without regard to the particular memory structure in which they're located. This may be particularly helpful for applications, such as 3D graphics or financial applications that can perform operations on large pieces of information concurrently. However, it may also be helpful for some traditional, more sequential, CPU applications, as well that make use of information that may be stored in a number of different locations.

In some embodiments, a program or thread can be run on the CPU that contains portions that may be suited for processing on a GPU. In this case, instructions or threads that can be run on the GPU, may be performed on the GPU in a similar fashion as described above, the result of which can then be returned the CPU for further processing. For example, because GPU's typically include very parallel floating point resources, floating point instructions scheduled on the CPU may be transferred to the GPU through shared memory or direct link and performed while the CPU is running other instructions. The floating point operations may then return their results to the CPU over the shared memory or direct link and the CPU can then incorporate these results into the remainder of operations being performed in the program. In one embodiment, the CPU contains either no floating point resources or very few floating point resources and relies substantially on the floating point resources of the GPU, such that the GPU and CPU share the floating point resources.

In some embodiments, where memories are organized or accessed according to segments, such as "pages", the processors (or memory interface logic) that access the pages may maintain structures (e.g., "page tables") to map a particular memory structure's page size or organization into the processor's or memory controller's paging size or scheme. For example, in one embodiment, in which a processor or memory controller may map a particular memory's physical pages onto a set number of virtual pages, which the processor or memory controller may open and close in response to a program accessing the pages.

Because in some embodiments, each processor or memory interface may access other memory structures, which may be controlled by or otherwise correspond to another processor memory interface, some communication between the processors/memory controllers may be desirable in order to maintain coherency between the page states (open/close) of each processor or memory controller. In one embodiment, an n-wide interconnect (where 'n' may indicate a variable number of channels/pins/lanes/traces, from 1 to more) may be used to communicate page state between the various processors or memory controllers, such that one processor doesn't close a page of memory that another processor may need to access. By communicating page state between the various processors (such as a GPU and a CPU) or memory controllers accessing one or more memories, unnecessary page open or close operations may be avoided, thereby improving access performance between the various processors or memory controllers. Moreover, in some embodiments, the n-wide interconnect may be of a relatively low bandwidth, so as not to require undue pins, power, or other resources.

Advantageously, embodiments of the invention may allow an application to run on multiple processors without regard to the memory device in which data is stored or is to be stored. This is particularly useful in graphics applications where, for example, one graphics processor is rendering half of the screen of pixels and another graphics processor is rendering the other half. In this situation, triangles that fall on the boundary may cause latency when filtered, as one processor will need to access adjacent texil information (corresponding to texils on the corresponding processor's half of the screen) from one memory and another processor will need to access adjacent texil information (corresponding to texils on the corresponding processor's half of the screen) from another memory. In this situation, a processor needing information from a non-corresponding memory may need to request it through the corresponding processor, which will have to return it to the requesting processor, which consumes bandwidth requiring a relatively high-bandwidth bus between the processors. Otherwise, software developers would have to make restrictions on where data is stored, which would be quite difficult, particularly in the event of rendering cross-border triangles.

In one embodiment, a page table maps an address provided by software onto locations in two memories corresponding to two processors used for performing throughput applications. Particularly, the page table uses bits of an address to access entries of the table, which contain addresses of information stored in alternating locations within the two memories. Therefore, when software stores or accesses the information the page table automatically routes the access to the appropriate memory without the requesting software (OS or application) understanding or caring about where the information is actually stored. In this way, information can be accessed at burst speeds from either memory in an alternating fashion, thereby maximizing the bandwidth of each processor's memory interface and avoiding a relatively high-bandwidth bus to support cross-memory/processor accesses.

In some embodiments, multiple processors (e.g., CPU and GPU) may provide data to a requesting application by managing the request in an efficient way, such as by using a coherency filter. In one embodiment, a coherency filter may include one or more coherency tables or other structure corresponding to and accessible by one or more processors, such that a request for data by an application running on one processor may cause that processor to access a table indicating address of data that may be currently accessible by another processor (e.g., vis-à-vis in the processor's cache, buffer, or other structure, in a page currently open in the processor's corresponding memory, etc.). If the most recent version of the requested data resides in the other processor's cache, the processor receiving the request may signal the other processor to return the requested data to the requesting application, or the processor receiving the request may retrieve the data from the processor over the n-wide interprocessor interconnect. In some embodiments, each processor may include multiple processors, in which case each processor may correspond to a processor socket.

In some embodiments, the above described techniques may be applied to processors or systems having two, four, eight, or more processors or cores that are either the same type (CPU) or different types (CPU and GPU), or other accelerators. Furthermore, embodiments of the invention may be applied to a number of different system or processing configurations or applications, including general purpose computers, graphics game consoles, graphics card applications, etc. In one embodiment, techniques described herein involve one or more processors to run 3D graphics or other applications, such as financial applications, medical applications, imaging applications, etc. In other embodiments, techniques described herein may be used in conjunction with general purpose CPU's for running sequential or more traditional workloads. In still other embodiments, techniques described herein may be used in conjunction with hybrid processors designed to run both traditional CPU workloads and throughput applications, such as processors including traditional CPU and graphics-specific logic ("CPU+GPU"). In one embodiment, techniques described herein are used in conjunction with one or more processors having a number of CPU processor cores, able to perform SIMD instructions, coupled to an interconnect along with parallel-application specific logic, such as graphics texture sampling logic.

FIG. 1 illustrates a microprocessor in which at least one embodiment of the invention may be used. FIG. 1 illustrates a processor that may be used for traditional CPU applications, throughput applications (e.g., 3D graphics applications) or a combination of traditional CPU and throughput applications. Processor 100 includes a number of processing cores 100-1 through 100-N, dedicated throughput application hardware 110 (e.g., graphics texture sampling hardware), memory interface logic 120, organized along a ring interconnect 130. In some embodiments, the processor 100 may include one or more last-level caches 135 that is inclusive of information from caches 101-1 through 101-N within each core 100-1 through 100-N. In one embodiment, one or more processing cores 100-1 through 100-N is able to perform SIMD operations.

In one embodiment, each of the CPU's can perform some scheduled operations on the GPU hardware by transferring these operations over shared memory or direct link (or ring link, in the embodiment illustrated in FIG. 1). Conversely, operations scheduled on the graphics hardware can be transferred to an available CPU using similar mechanisms.

In some embodiments, information, such as graphics textures, or other information requiring a relatively large amount of memory bandwidth, may be accessed from other memory corresponding to another processor (not shown), without application software being aware or concerned about the memory in which the information is stored. In some embodiments, processor 100 may include more or fewer memory controllers than illustrated in FIG. 1. Moreover, the memory controllers of FIG. 1 may be internal to the processor 100 or external to the processor 100.

Figure 2:
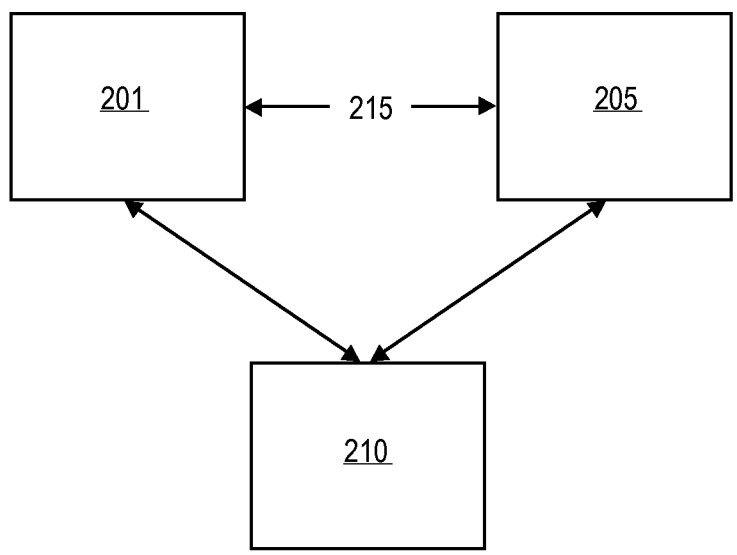
FIG. 2 illustrates a CPU and GPU sharing resources, according to one embodiment.

FIG. 2 illustrates a GPU and CPU sharing resources, according to one embodiment. In one embodiment, the CPU 201 is primarily used to run more sequential programs, whereas the GPU 205 is used to run more parallel programs. In one embodiment, instructions scheduled on either the CPU or the GPU can be transferred or "migrated" to between the CPU and GPU using shared storage 210. In one embodiment, shared storage is an area of memory enumerated as PCI shared memory, in which the CPU or GPU can write and read information related to the migrated instructions. For example, in one embodiment, in which graphics operations are being performed by the GPU, a portion of the graphics operations can be transferred for processing to the CPU if the CPU is available by writing the instructions and data to be performed by the CPU to the shared memory and indicating through an interrupt or other direct link between the CPU and GPU that the CPU should read the information from the shared memory resource and perform the operations indicated therein. In one embodiment, the GPU may then continue processing other operations while the CPU is processing the transferred tasks. When the CPU completes the tasks, it may write its results to the shared memory and indicate to the GPU that the results are available through an interrupt or direct communication link, such that the GPU can read the results and incorporate them into the graphics rendering pipeline. In one embodiment, the converse use of the shared memory resource may be performed, where the CPU is performing operations, some of which may be performed by the GPU.

In one embodiment, a direct link 215 is used to share either the information to be transferred between the CPU and GPU (instead of using shared memory, for example) and/or to signal each other that information is available in the shared memory. In one embodiment, the direct link is used to share page information so that one processor doesn't close a page that the other processor may need. In one embodiment, the sharing of resources among a CPU and GPU is controlled by logic in the CPU, GPU or both or located elsewhere in the system. In some embodiments, the sharing of resources is controlled by middle-ware, a driver or driver-like software, or virtual machine manager or hypervisor. Advantageously, embodiments may be used without the application software or OS knowing anything about the sharing of resources. In one embodiment, portions of a graphics API may control the sharing of CPU and GPU resources. Particularly, an API that is aware of the underlying resources may make use of the resources based on the operations performed in its graphics rendering pipeline.

Figure 3:
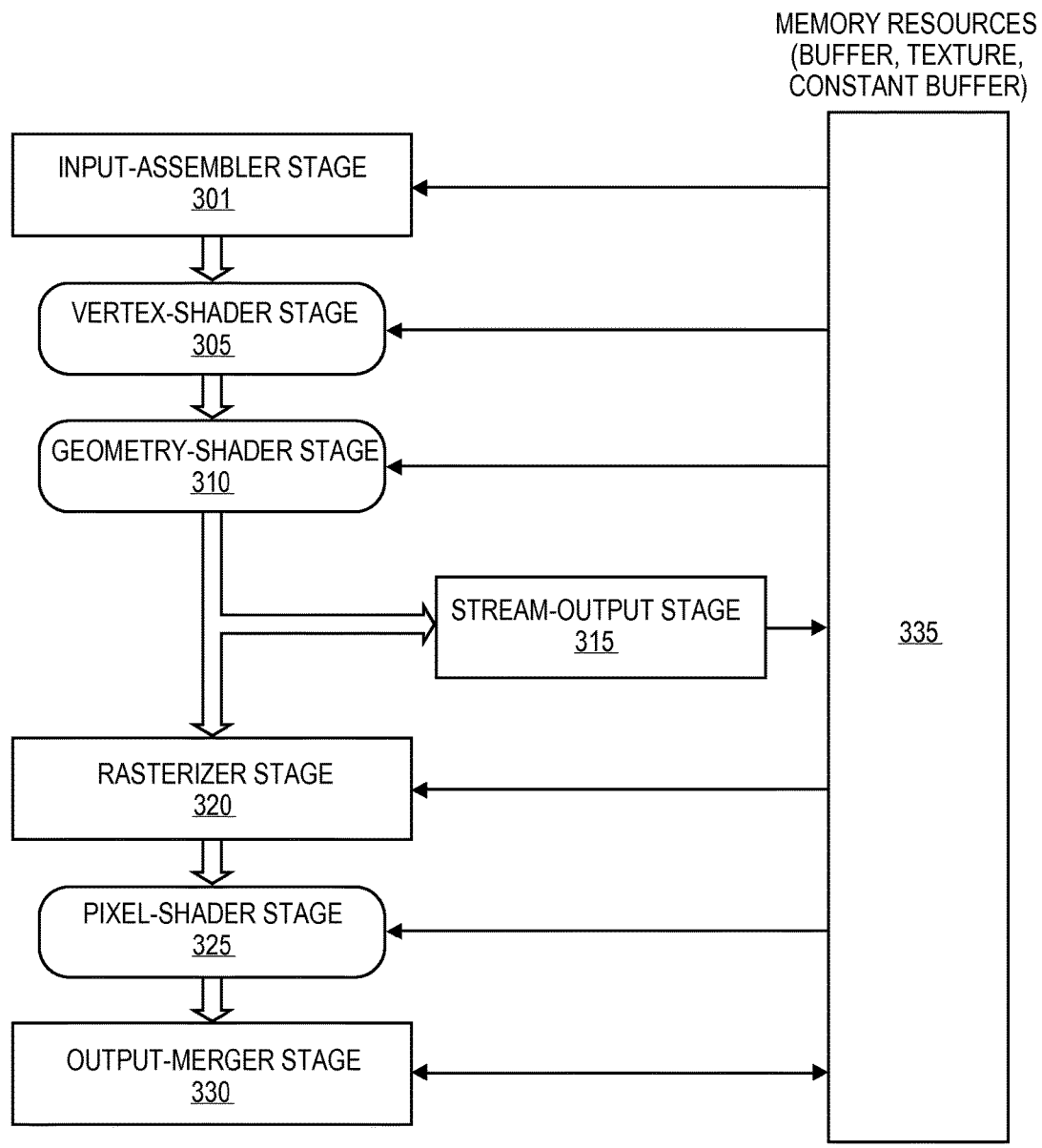
FIG. 3 illustrates a 3D graphics rendering pipeline according to one embodiment.

FIG. 3 illustrates a graphics rendering pipeline, according to one embodiment. In one embodiment, the graphics rendering pipeline of FIG. 3 includes an input assembler stage 301, a vertex shader stage 305, a geometry shader stage 310, a stream output stage 315, a rasterizer stage 320, a pixel shader stage 325, and an output merger stage 330. Also, graphics rendering pipeline may make use of a shared memory resource, such as buffers, located in shared memory resource 335.

In one embodiment, one or more, or a portion of one or more, graphics rendering pipeline stages illustrated in FIG. 3 may be transferred to either a CPU resource or another GPU resource, depending on the operations to be performed and the availability of hardware resources. For example, in one embodiment, the vertex shader stage is performed by a CPU having available hardware resources by transferring or scheduling instructions to the CPU by the API, for example, using the shared memory resource. Once the CPU has completed those operations, it may then transfer its results to the GPU using the shared memory resource. In one embodiment, the API or other software may schedule instructions to be performed on the CPU and some on the GPU, where the CPU and GPU each have their own scheduling logic or a shared scheduling logic and a shared resource, such as floating point logic. In one embodiment, integer operations may be scheduled on the integer logic (which may be located within a CPU) and floating point operations may be scheduled on the floating point logic (which may be located within the GPU).

Figure 4:
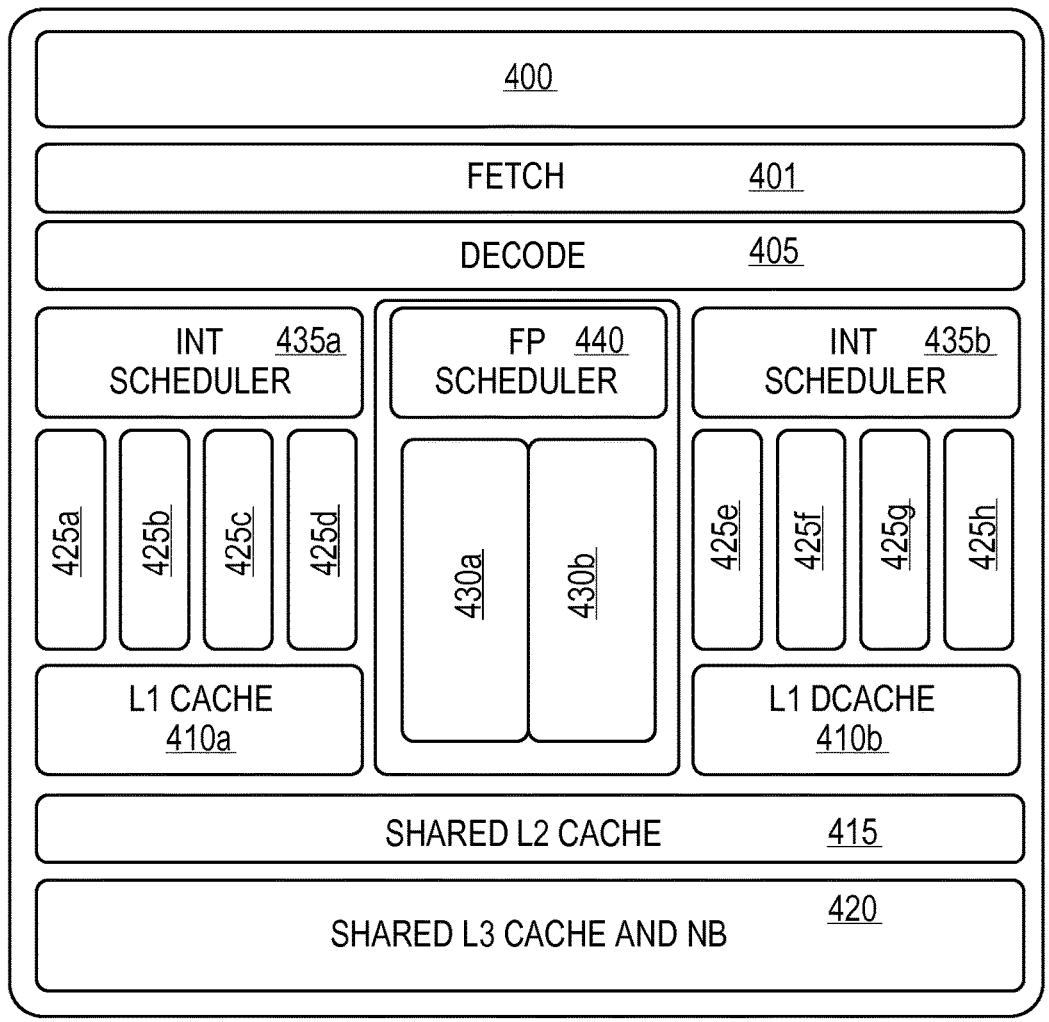
FIG. 4 illustrates a floating point logic being shared by a number of processor cores, according to one embodiment.

FIG. 4 illustrates one embodiment, in which a CPU and GPU share floating point and integer resources. Particularly, FIG. 4 illustrates a processor 400 having fetch logic 401 to fetch instructions, decode logic 405 to decode instructions, L1 data cache 410a-b to store data used by the instructions, a shared L2 cache 415 and shared L3 cache 420 to be used by multiple agents. In addition, FIG. 4 illustrates integer execution resources 425a-h to perform integer instructions and floating point execution resources 430a-b to perform floating point instructions. Furthermore, in one embodiment, the floating point execution resources and the integer execution resources have their own dedicated scheduling logic 435a-b and 440. In one embodiment, the floating point resources include 128-bit floating point multiply accumulate (FMAC) logic. In some embodiments, the scheduling resources are at least partially shared.

In one embodiment, instructions requiring floating point resources, can be scheduled on the floating point resources using the floating point scheduler whereas instructions requiring integer execution resources can be scheduled on the integer execution units using an integer scheduler. In one embodiment, a hypervisor, middle-ware, driver, or API can schedule portions of a program requiring floating point resources on the floating point execution units using the floating point scheduler logic concurrently or serially with integer instructions scheduled on the integer execution resources by the integer schedulers. In one embodiment, FIG. 4 illustrates a CPU, in other embodiments, it illustrates a GPU, and in other embodiments, Figure is a CPU and a GPU.

Figure 5:
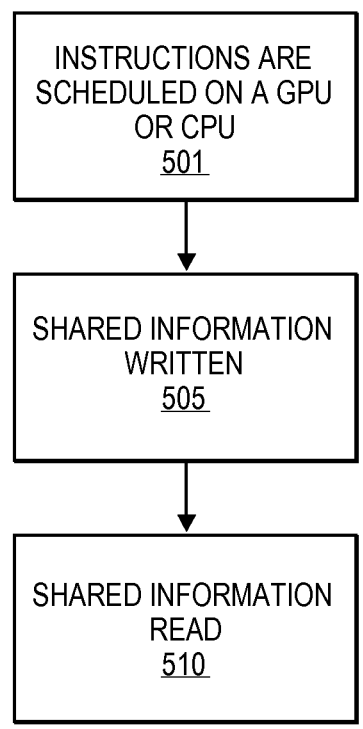
FIG. 5 is a flow diagram of operations used in accordance with at least one embodiment.

FIG. 5 is a flow diagram illustrating operations that may be performed according to one embodiment. At 501, instructions are scheduled on a GPU or CPU. At operation 505, instructions scheduled on a GPU or CPU share information using a shared memory or direct link by writing information to the shared memory or direct link. At operation 510, a user of the shared information reads the information from the shared memory or direct link. In other embodiments, other operations may be performed.

Figure 7:
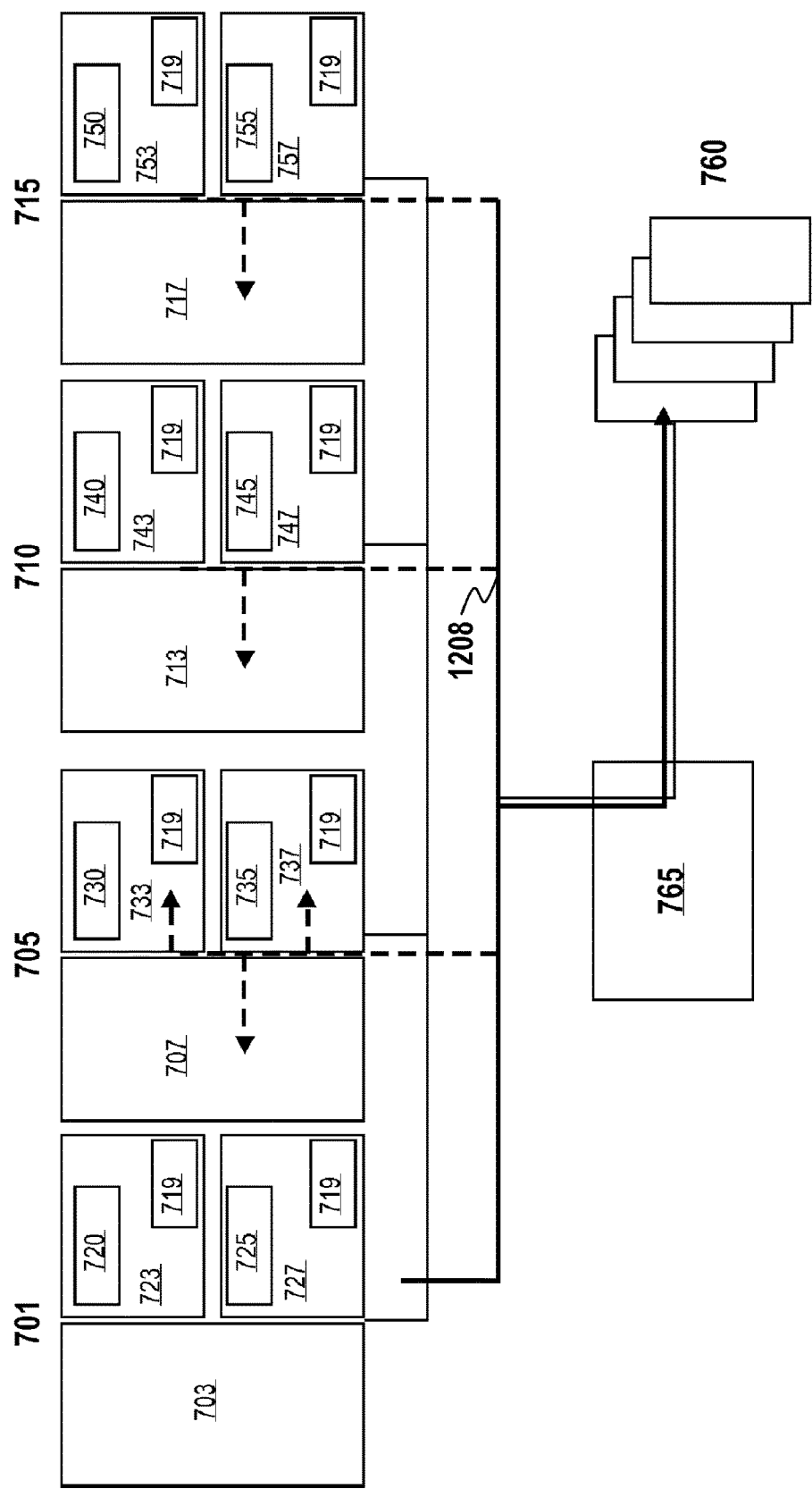
FIG. 7 illustrates a point-to-point interconnect computer system, in which at least one embodiment of the invention may be used.

FIG. 7, for example, illustrates a shared-bus computer system (e.g., front-side-bus (FSB) computer system) in which one embodiment of the invention may be used. Any processor 701, 705, 710, or 715 may include asymmetric cores (differing in performance, power, operating voltage, clock speed, or ISA), which may access information from any local level one (L1) cache memory 720, 725, 730, 735, 740, 745, 750, 755 within or otherwise associated with one of the processor cores 723, 727, 733, 737, 743, 747, 753, 757. Furthermore, any processor 701, 705, 710, or 715 may access information from any one of the shared level two (L2) caches 703, 707, 713, 717 or from system memory 760 via chipset 765.

Embodiments of the invention may exist in any of the processors or agents illustrated in FIG. 7. For example, logic 719 may be incorporated within any or all processors 723, 727, 733, 737, 743, 747, 753, 757, to perform aspects of at least one embodiment. Particularly, logic 719 may be used to detect, transmit, and interpret signals from other agents with in the system to determine whether to open or close a page of memory, depending on whether a page is currently being accessed by another agent. In other embodiments, the logic 719 is distributed among multiple agents. Still in other embodiments, logic 719 may include software, hardware, or some combination thereof.

In addition to the FSB computer system illustrated in FIG. 7, other system configurations may be used in conjunction with various embodiments of the invention, including point-to-point (PtP) interconnect systems and ring interconnect systems. The PtP system of FIG. 6, for example, may include several processors, of which only two, processors 670, 680 are shown by example. Processors 670, 680 may each include a local memory controller hub (MCH) 672, 682 to connect with memory 62, 64. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639.

Figure 6:
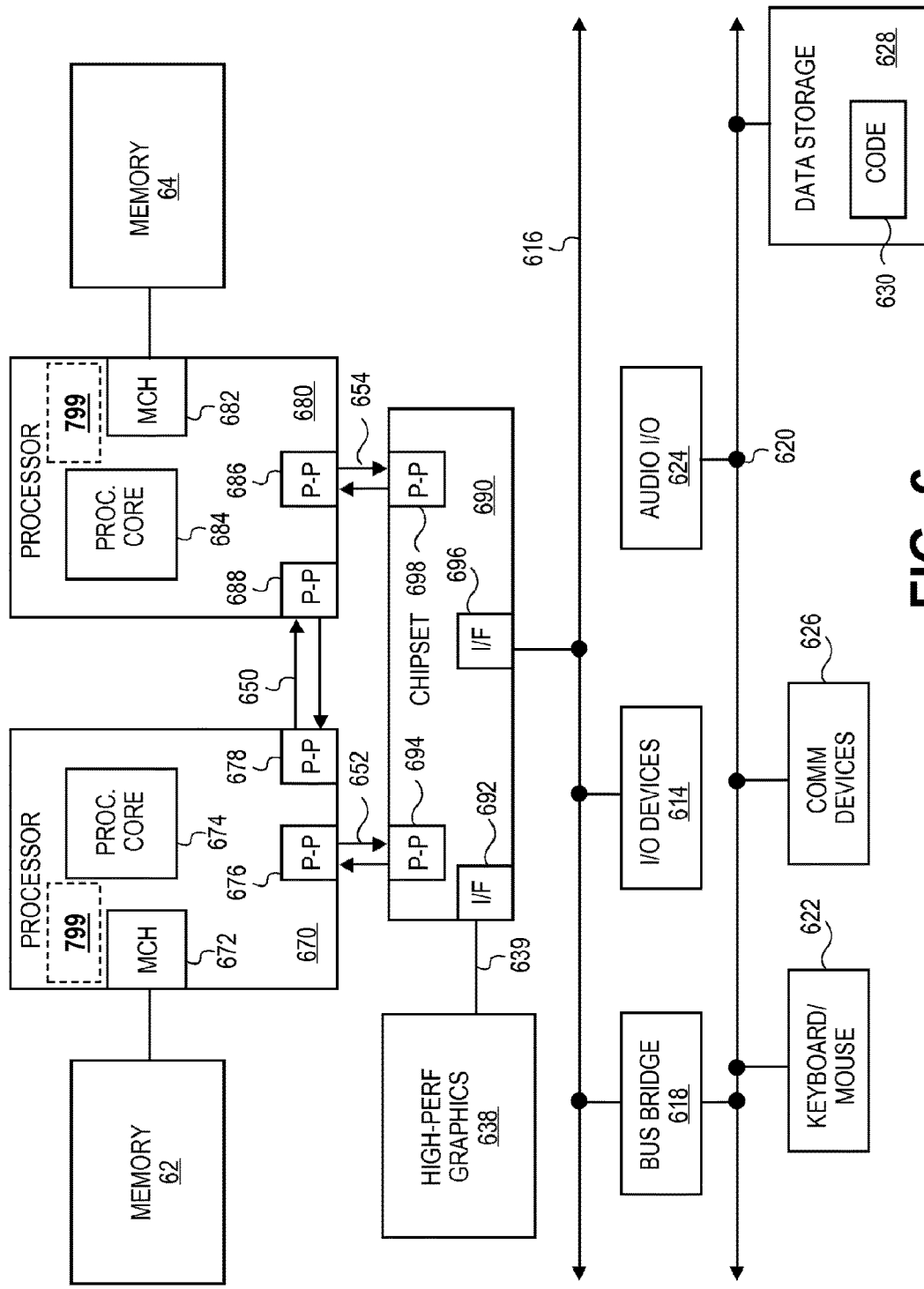
FIG. 6 illustrates a shared interconnect system, in which at least one embodiment may be used.

Embodiments of the invention may be included in any processor or agent within FIG. 6. For example, logic 799 may be incorporated within either or both processors 670, 680, to perform aspects of at least one embodiment. Particularly, logic 799 may be used to detect, transmit, and interpret signals from other agents with in the system to determine whether to open or close a page of memory, depending on whether a page is currently being accessed by another agent. In other embodiments, the logic 799 is distributed among multiple agents. Still in other embodiments, logic 799 may include software, hardware, or some combination thereof.

Many different types of processing devices could benefit from the use of such process re-allocation techniques. For example, the processing units 600-1 through 600-N may be general purpose processors (e.g., microprocessors) or may be microprocessor cores for a multiple core (on a single die) microprocessor. Alternatively, digital signal processors, graphics processors, network processors, or any type of special purpose processor that may be used in a system with multiple parallel units or cores may benefit from thermally (or power) motivated process shifting between processing units. The processing units or processors may be identical or have at least partial functional overlap. That is, each processing unit has some common set of instructions or commands such that there are at least some (if not all) processes that can be executed on more than one processing unit or processor. In other embodiments, the processing units may be asymmetrical, in as much as they have any or a combination of different performance capabilities, number of transistors, power consumption or thermal characteristics, clock frequencies, or ISA.

In order to facilitate expedient processing and return of requested data, at least one embodiment may include a coherency filter to determine how best (e.g., fastest) way to retrieve data requested by an application. For example, in one embodiment, a coherency filter may include a coherency table whose entries include information about data currently accessible by any processor or processors in the system. In one embodiment, the coherency table for a processor includes a list of addresses indicating the data that may be available within a cache, buffer, or other storage structure of another processor in the system, such that when an application requests data, the processor may first check its coherency table to see if another processor currently has the data. If so, the data may be retrieved by the processor servicing the request by retrieving the data across the inter-processor n-wide interconnect. Because the table, in one embodiment, would only indicate some of the data that is available in either processor's cache/buffers/etc., (indeed, the table could vary in the amount of info contained therein), the traffic on the n-wide inter-processor interconnect could be reduced, or at least controlled, according to the information or size of the coherency table(s).

FIG. 7 illustrates a system in which one embodiment of the invention may be used, including a coherency filter. In FIG. 7, an application or thread running on processor 705 may request data by providing an address to processor 705. Processor 705 may then access a coherency table, stored in the processor or some memory 760 accessible by the processor, to determine whether the requested data is currently within a cache or buffer within processor 710. If, for example, the table indicates that the requested data is currently available in processor 710, the processor 705 may retrieve the data from processor 710 across interconnect 1208, thereby providing the data to the program in the most expedient manner possible. In one embodiment, the table is referenced with a portion of the address provided by the application or thread to processor 705. Furthermore, in at least one embodiment, a different table (or the same table) corresponds to each processor in the system and is maintained by creating an entry within the table for each requested address that is found in another processor. Furthermore, each entry may include information to indicate when the data is not found within another processor, or the entry may be removed altogether. Various coherency table maintenance schemes and algorithms may be used to keep track of information that is to be shared between the processors across the interconnect 1208.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
   a central processing unit (CPU);
   a graphics processing unit (GPU) coupled to the CPU; and
   shared scheduling logic to determine what GPU and CPU processing resources are best used to perform one or more instructions, and to cause resource sharing by the CPU and the GPU by scheduling the one or more instructions for execution on one of the CPU and GPU, but to be performed by the execution resources of the other one of the CPU and GPU, wherein execution results of the one or more instructions are to be returned to said one of the CPU and GPU over a virtual page of a shared memory, and wherein the shared scheduling logic comprises a hypervisor to control the CPU and the GPU as virtual machines, wherein the other one of the CPU and GPU sends a direct link to the virtual page to indicate to the one of the CPU and GPU that information is available in the shared memory, the direct link to include page information to prevent one of the CPU and GPU from closing a page that the other one of the CPU and GPU may need.

2. The apparatus of claim 1 further comprising logic to communicate page information between the CPU and GPU.

3. The apparatus of claim 2, wherein the GPU includes floating point execution resources to be used by the CPU.

4. The apparatus of claim 1, wherein the CPU and GPU are to utilize a coherency filter to access the virtual page of the shared memory.

5. The apparatus of claim 1, wherein the CPU and GPU share floating point logic.

6. The apparatus of claim 1, wherein the one or more instructions are part of user-level software written without regard to underlying processing resources, and wherein the shared scheduling logic determines what resources are best used for execution, the user-level software being unaware of the resource sharing.

7. The apparatus of claim 1, wherein the CPU and GPU are implemented as part of a single die.

8. The apparatus of claim 1, wherein the CPU and GPU are incorporated into a single processor.

9. The apparatus of claim 1, wherein the shared scheduling logic is to schedule sequential instructions for execution by the CPU, and to schedule single-instruction, multiple-data (SIMD) and multiple-instruction, multiple-data (MIMD) instructions for execution by the GPU.

10. The apparatus of claim 1, wherein the shared scheduling logic is to schedule integer instructions for execution by the CPU, and to schedule floating-point instructions for execution by the GPU.

11. The apparatus of claim 10, wherein integer execution resources and floating-point execution resources each have their own dedicated scheduling logic used to schedule integer instructions and floating-point instructions, respectively, for execution.

12. The apparatus of claim 1, wherein the shared memory comprises a physical memory having its physical pages mapped onto a plurality of virtual pages.

13. A system comprising:
    a central processing unit (CPU);
    a graphics processing unit (GPU) coupled to the CPU;
    shared scheduling logic to determine what GPU and CPU processing resources are best used to perform one or more instructions, and to cause resource sharing by the CPU and the GPU by scheduling the one or more instructions for execution on one of the CPU and GPU, but to be performed by the execution resources of the other one of the CPU and GPU, wherein execution results of the one or more instructions to be returned to said one of the CPU and GPU over a virtual page of a shared memory, and wherein the shared scheduling logic comprises a hypervisor to control the CPU and the GPU as virtual machines, wherein the other one of the CPU and GPU sends a direct link to the virtual page to indicate to the one of the CPU and GPU that information is available in the shared memory, the direct link to include page information to prevent one of the CPU and GPU from closing a page that the other one of the CPU and GPU may need.

14. The system of claim 13 further comprising logic to communicate page information between the CPU and GPU.

15. The system of claim 13, wherein the GPU includes floating point execution resources to be used by the CPU.

16. A method comprising:
    determining, using shared scheduling logic, what processing resources of a central processing unit (CPU) and a graphics processing unit (GPU) to best use to perform an instruction;
    scheduling, using the shared scheduling logic, the instruction on a first processor having a first set of execution resources, wherein the first processor is one of the CPU and the GPU;
    migrating the scheduled instruction from the first processor to be performed on a second processor having a second set of execution resources asymmetric with the first processor; and
    transferring information resulting from performing the instruction on the second processor to the first processor through a virtual page of shared memory, wherein the shared scheduling logic comprises a hypervisor to control the CPU and the GPU as virtual machines, wherein the other one of the CPU and GPU sends a direct link to the virtual page to indicate to the one of the CPU and GPU that information is available in the shared memory, the direct link to include page information to prevent one of the CPU and GPU from closing a page that the other one of the CPU and GPU may need.

17. The method of claim 16, wherein the first processor is a CPU and the second processor is a GPU.

18. The method of claim 17, further comprising communicating page information from between the first and second processor.

19. The method of claim 16, wherein the second processor includes floating point execution resources to be used by the first processor.

* * * * *